United States Patent [19]

Fenton

[11] Patent Number: 4,525,191
[45] Date of Patent: Jun. 25, 1985

[54] METHOD OF COOLING A GLASS WARE MOULD

[75] Inventor: Frank A. Fenton, Wheatley, England

[73] Assignee: Emhart Industries, Inc., Farmington, Conn.

[21] Appl. No.: 511,055

[22] Filed: Jul. 5, 1983

[30] Foreign Application Priority Data

Jul. 9, 1982 [GB] United Kingdom ............... 8219984

[51] Int. Cl.³ ............................................. C03B 9/38
[52] U.S. Cl. ........................................ 65/83; 65/85; 65/234; 65/265; 65/267; 65/356
[58] Field of Search ................ 65/29, 82, 83, 265, 65/267, 162, 319, 355, 356, 234, 85

[56] References Cited

U.S. PATENT DOCUMENTS

| 1,499,522 | 7/1924 | Hall | 65/265 |
| 3,598,558 | 8/1971 | Ayers | 65/162 |
| 4,191,548 | 3/1980 | Fortner | 65/234 X |

Primary Examiner—Arthur Kellogg
Attorney, Agent, or Firm—Arthur B. Moore

[57] ABSTRACT

A method of cooling a blank mould which is used for making a parison in a glass container forming machine. The mould is provided with air passages which communicate with air passages in a baffle of the mould when the baffle is in position on the mould and air is blown through the passages in the baffle into the passages in the mould to cool the mould. The method may be used whether the parison is formed by blowing or by pressing. A baffle for use in the method is also claimed.

9 Claims, 2 Drawing Figures

METHOD OF COOLING A GLASS WARE MOULD

BACKGROUND OF THE INVENTION

This invention is concerned with a method of cooling a blank mould of a glass container forming machine and with a baffle for use in such a method.

In a glass container forming machine in which a parison is formed in a blank mould and is then blown to its final shape in a further mould to which the parison is transferred, the parison is formed either by blowing or by pressing. In either case, the parison is usually formed in an inverted position, i.e. with its neck at the bottom, and is supported by its neck during transfer. The blank moulds of such machines are provided with a baffle which is used whether the parison is formed by blowing or pressing but in different ways. When the parison is formed by blowing, a funnel is positioned on the blank mould to guide a gob of molten glass into the blank mould, once the gob has entered the mould, the baffle is positioned on top of the funnel so that air passages in the baffle communicate via the funnel with the interior of the mould and air is blown into the mould through the passages so that the gob is pressed downwards in the mould by the "settle blow" air, next the baffle is raised and the funnel is removed, then the baffle is positioned on top of the mould so that the air passages are closed by contact with the mould and a surface portion of the baffle closes the top of the mould, and the parison is then blown with the surface portion of the baffle cooperating in shaping the parison. When the parison is formed by pressing, it is not necessary to blow the gob downwards in the mould and, therefore, the baffle is not positioned on the funnel but is positioned on the mould after removal of the funnel. When the parison is pressed, the baffle either has no air passages or such air passages are not used.

In both the above-mentioned methods of forming a parison, difficulty is experienced in adequately cooling the mould since the area containing the most glass and having the least contact time and therefore requiring the most cooling is at the top of the blank mould and not accessible to cooling means other than air blown on to the outside of the mould. Furthermore, it is difficult to control the amount of cooling achieved by air blown on to the outside of the blank mould especially if it is desired to cool some portions of the mould more than others.

It is an object of the present invention to provide a method of cooling a blank mould of a glass container fforming machine in which consistent and controlled cooling of the top portion of the blank mould can be achieved.

BRIEF SUMMARY OF THE INVENTION

The object is achieved according to the invention in that a baffle of the blank mould is provided with air passages which, when the baffle is in position on the mould, communicate with air passages in side portions of the mould, the method comprising blowing cooling air through the passages in the baffle into the passages in the side portions.

In a method according to the invention, the problems of access to the top of the blank mould are solved by utilising air passages in the baffle and the cooling can be controlled by the positioning of the air passages and/or by varying the rate of air flow through the air passages.

The invention also provides a baffle for use in a method of cooling a blank mould of a glass container forming machine, the baffle comprising a projection which is arranged to fit closely into a cavity formed by side portions of a blank mould, which cavity communicates with the mould cavity of the mould, the projection having a surface portion which is arranged to form part of the bounding surface of the mould cavity when the baffle is in position on the mould, wherein the baffle is provided with air passages having openings around but outside the projection which are arranged to communicate with air passages in the side portions when the baffle is in position on the mould and is also provided with further air passages having openings on the projection but outside said surface portion thereof.

In order to give uniform cooling around the mould, the air passages in the side portions are distributed in a circle around the mould cavity of the blank mould, and the openings outside the projection of the air passages in the baffle are distributed in a circle about the projection.

Conveniently each of the air passages in the side portions is vented to atmosphere through an air passage which extends to the outer surface of the side portion.

In order to provide control whereby the rate of flow of air through the air passages can be varied from one to another, each of the air passages in the baffle with openings outside the projection is provided with a restrictor whereby the air flow through the air passage can be controlled.

BRIEF DESCRIPTION OF THE DRAWINGS

An illustrative method of cooling a blank mould of a glass container forming machine is described hereinafter and illustrated by the drawings which show an illustrative baffle for use in the method.

In the drawings.

DETAILED DESCRIPTION

Figure 1:
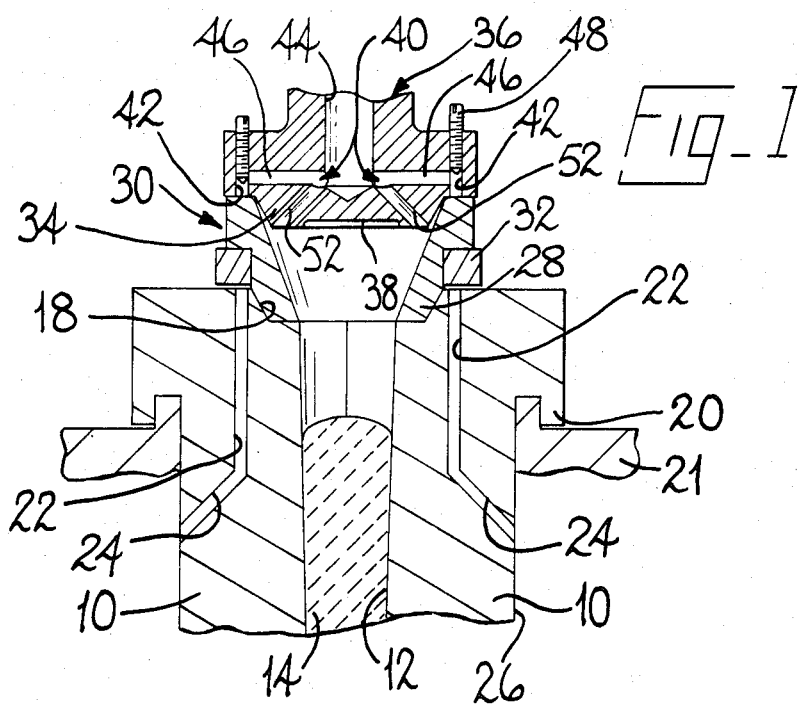
FIG. 1 is a cross-sectional view showing the illustrative baffle in position on a funnel which is in position on a blank mould.

The drawings show two side portions 10 of a blank mould which have been brought together to form a mould cavity 12. A gop 14 of the molten glass is shown in the mould cavity 12 and is to be formed into a parison 16 (shown in FIG. 2) by blowing.

The two mould portions 10 co-operate to define a cavity 18 in an upper end portion of the blank mould. This cavity 18 communicates with the mould cavity 12. Each mould portion 10 has a hook 20 by which it is attached to carrying arms 21 for the mould portions 10.

Each of the mould portions 10 defines vertically-extending air passages 22 which open though the upper surfaces of the side portions 10 adjacent the cavity 18. The air passages 22 are distributed in a circle around the mould cavity 12. Each of the air passages 22 is also vented to atmosphere through an air passage 24 which communicates with the air passages 22 and extends to the outer surface 26 of the side portion 10 in which the air passages 22 is formed.

Figure 2:
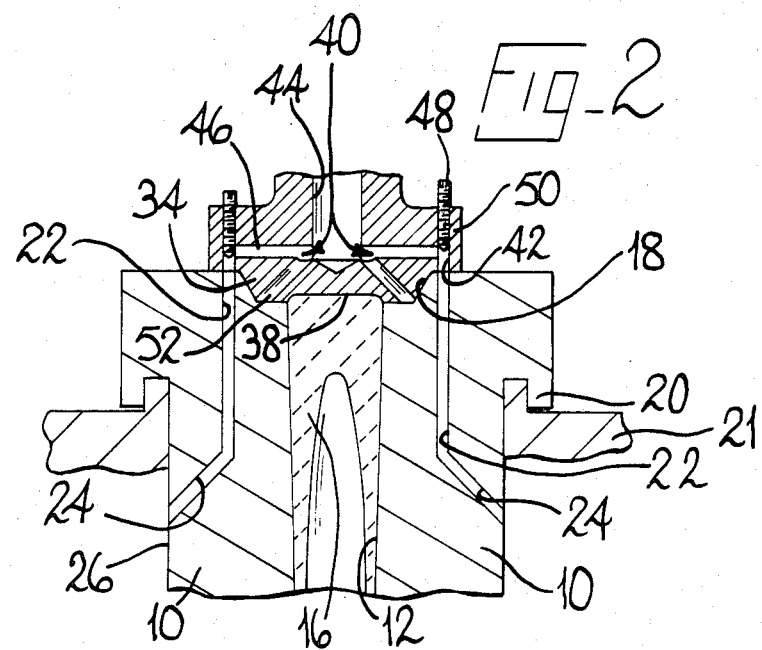
FIG. 2 is a cross-sectional view similar to FIG. 1 but showing the illustrative baffle in position on the blank mould.

The cavity 18 is arranged to receive a lower projection 28 of a funnel 30 which serves to guide a gob 14 into the mould cavity 12, the funnel 30 being supported by a support ring 32 (see FIG. 1). The cavity 18 is also arranged to receive, in place of the projection 28, a lower projection 34 of a baffle 36. The projection 34 is arranged to fit closely into the cavity 18 (as shown in FIG. 2) and has a surface portion 38 which is arranged to form part of the bounding surface of the mould cavity 12 when the baffle 36 is in position on the mould.

The baffle 36 is provided with air passages 40 which, when the baffle 36 is in position on the mould, communicate with the air passages 22 in the side portions 10. The passages 40 each have a vertical portion 42 which has an opening in the lower surface of the baffle 36 outside the projection 34. These openings are distributed in a circle around the projection 34 so that, when the baffle 36 in in position on the mould, the openings fit over the openings of the air passages 22. Each vertical portion 42 is connected to a central pipe 44 in the baffle 36 by a horizontal portion 46 of the passage 40.

Each air passage 40 is provided with a restrictor 48 which extends into the vertical portion 42 thereof. The restrictors 48 are to control the air flow through the passage 40 and can be individually adjusted. The restrictors 48 are threadedly-received in bores 50 which communicate with the vertical portions 42.

The baffle 36 is also provided with further air passages 52 which communicate with the central pipe 44 and have openings on the projection 34 but outside the surface portion 38. Thus, as the air passages 40 and 52 all communicate with the central pipe 44, they are arranged to be supplied with air from a common source. The air passages 52 are to provide settle blow air for the blank mould.

The illustrtive baffle 36 is shown in the drawings in use in a method of forming a parison by blowing. In FIG. 1, the funnel 30 is in position on the mould, the gob 14 has entered the mould cavity 12 through the funnel 30, and the baffle 36 has been positioned on the funnel 30. In FIG. 1, the baffle 36 is being used to apply settle blow air to the mould cavity 12. To do this, air under pressure is applied to the pipe 44 so that air blows through the air passages 52 through the funnel 30 and into the mould cavity 12. The air passages 40 are closed by contact with the funnel 30.

In FIG. 2, a subsequent stage to that shown in FIG. 1 is shown. The baffle 36 has been raised, the funnel 30 removed, and the baffle 36 positioned on the mould. The air passages 52 are now closed by contact with the side portions 10 but the air passages 40 are being used to carry out the illustrative method of cooling in which air under pressure is supplied to the pipe 44 causing air to flow through the air passages 40 into the passages 22 in the side portions and out through the passages 24.

FIG. 2 could equally well illustrate the application of the illustrative method of cooling to a method of making a parison by pressing except that the pressing plunger is not shown and, although the illustrative baffle 36 can be used, a modification of the illustrative baffle 36 in which the air passages 52 are omitted could also be used, since the air passages 52 are not required as no settle blow air is needed.

In the illustrative method of cooling, the blank mould is adequately cooled in the area requiring most cooling and the cooling effect can be varied using the restrictors 48 and/or by varying the air pressure in the pipe 44.

I claim:

1. An improved method for forming a parison of the type including the steps of guiding a gob of molten glass into a mold cavity of a blank mold through a funnel at a mouth of the mold, blowing or pressing the molten glass to cause it to form the parison within the mold cavity, and closely fitting a baffle over the mouth of the mold to seal the mold during or after forming of the parison, wherein the improvement comprises the step of cooling the parison by blowing cooling air through air passages in the baffle which communicate with air passages in side portions of the mold, said side portion air passages in turn being vented to atmosphere.

2. A method according to claim 1, wherein the air passages in the side portions are distributed in a circle around the mould cavity of the blank mould.

3. A method according to claim 1, further comprising the step of controlling the flow of air in each of the air passages in said baffle with a restrictor for that air passage.

4. A method according to claim 1, of the type wherein the parison is formed by blowing settle blow air into the mold cavity, wherein the baffle includes a further air passage for said settle blow air.

5. A method according to claim 4, wherein said further air passage does not communicate with the mold cavity during said cooling step.

6. A method according to claim 1, wherein each of the side portion air passages extends to the outer surface of the side portion.

7. Apparatus for cooling the blank mold of a glass container forming machine, comprising:
   a blank mold comprised of side portions defining a mold cavity, said side portions having air passages therein which are vented to atmosphere;
   a baffle which is configured to fit closely to a mouth formed by the side portions of said blank mold, which mouth provides access to the mold cavity, said baffle having air passages which communicate with the air passages in the side portions of the mold when the baffle is fitted to the mouth of said mold; and
   means for supplying cooling air to the baffle air passages, and thereby through the side portion air passages to be vented to atmosphere.

8. Apparatus according to claim 7, further comprising a member for guiding molten glass into the mold cavity, wherein the baffle includes a further air passage which communicates with the mold cavity while said baffle is fitted against said member for blowing settle blow air into the mold cavity.

9. Apparatus according to claim 8, wherein said further air passage does not communicate with the mold cavity when the baffle is fitted to the mouth of said mold.

* * * * *